(12) United States Patent
Takeda et al.

(10) Patent No.: US 6,659,845 B2
(45) Date of Patent: Dec. 9, 2003

(54) GRINDING METHOD, ELECTRONIC COMPONENT, AND VARIABLE CAPACITOR

(75) Inventors: Hiromichi Takeda, Fukui-ken (JP); Hiroyuki Kishishita, Fukui-ken (JP); Hidetoshi Kita, Fukui-ken (JP); Keizo Morita, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 145 days.

(21) Appl. No.: 09/759,587

(22) Filed: Jan. 12, 2001

(65) Prior Publication Data

US 2001/0041510 A1 Nov. 15, 2001

(30) Foreign Application Priority Data

Jan. 12, 2000 (JP) ........................................ 2000-003345

(51) Int. Cl.$^7$ ................................................. B24B 1/00
(52) U.S. Cl. ........................... 451/41; 451/53; 451/54; 451/63; 451/397
(58) Field of Search .............................. 451/41, 53, 54, 451/63, 397, 398

(56) References Cited

U.S. PATENT DOCUMENTS

| | | | | | |
|---|---|---|---|---|---|
| 4,019,285 | A | * | 4/1977 | Gravell ........................ | 451/390 |
| RE31,897 | E | * | 5/1985 | Johnson ........................ | 112/197 |
| 5,424,906 | A | * | 6/1995 | Kishishita et al. ........ | 361/298.1 |
| 6,134,097 | A | * | 10/2000 | Shibata ...................... | 361/298.1 |
| 6,261,162 | B1 | * | 7/2001 | Hirokawa et al. ........... | 451/285 |
| 6,439,987 | B1 | * | 8/2002 | Ripper et al. ................ | 451/443 |
| 6,454,635 | B1 | * | 9/2002 | Zhang et al. .................. | 451/41 |

FOREIGN PATENT DOCUMENTS

| | | |
|---|---|---|
| JP | 2001-526968 | 12/2001 |
| TW | 415872 | 12/2000 |

* cited by examiner

Primary Examiner—Joseph J. Hail, III
Assistant Examiner—Alvin J. Grant
(74) Attorney, Agent, or Firm—Keating & Bennett, LLP

(57) ABSTRACT

A grinding method, in which the grinding operation is performed on a plurality of workpieces having different thicknesses with an end surface in the thickness direction of each workpiece being a surface to be ground, includes the steps of holding the workpieces with a holder such that the surfaces to be ground of the individual workpieces are aligned in the same plane, and grinding the surfaces to be ground of the workpieces while the workpieces are held by the holder. An electronic component provided with an element ground by the grinding method, and a variable capacitor provided with an element ground by the grinding method are also disclosed.

20 Claims, 3 Drawing Sheets

GRINDING METHOD, ELECTRONIC COMPONENT, AND VARIABLE CAPACITOR

BACKGROUND OF THE INVENTION

1. Field of the Invention

The present invention relates to a grinding method in which the grinding operation is performed on a plurality of workpieces having different thicknesses with one end surface in the thickness direction of each workpiece constituting a surface to be ground. More particularly, the present invention relates to an improvement in achieving uniform grinding with respect to a plurality of workpieces.

The present invention also relates to an electronic component, such as a variable capacitor, provided with an element ground by the grinding method described above.

2. Description of the Related Art

Electronic components, to which the present invention is related, and more specifically, variable capacitors, are disclosed, for example, in Japanese Unexamined Patent Application Publication Nos. 6-290994 and 10-321467. The variable capacitors disclosed in these patent application publications include substantially the same elements. The variable capacitor described in Japanese Unexamined Patent Application Publication No. 10-321467 is shown in FIGS. 2 to 4.

FIG. 2 is a perspective view showing a variable capacitor 1, FIG. 3 is a perspective view of the variable capacitor 1 shown in FIG. 2, viewed from the bottom side, and FIG. 4 is a sectional view of the variable capacitor 1 shown in FIG. 2.

The variable capacitor 1 includes a stator 2, a rotor 3, and a cover 4.

The stator 2 composed of a ceramic dielectric member, and stator electrodes 5 and 6 are arranged side by side therein. Stator terminals 7 and 8 composed of conductive films are provided on the outer surfaces of the edges of the stator 2 to be electrically connected to the stator electrodes 5 and 6, respectively.

Two stator electrodes 5 and 6 and two stator terminals 7 and 8 are configured as described above such that the stator 2 has a symmetrical structure, and the variable capacitor 1 is assembled using the stator 2 without taking the direction of the stator 2 into consideration. In the assembled state shown in FIGS. 2 to 4, the stator electrode 5 and the stator terminal 7 function and the stator electrode 6 and the stator terminal 8 do not function.

A protruding section 9 is provided on the lower surface of the stator 2 so as to longitudinally extend in the central portion thereof.

The rotor 3 is composed of a conductive metal, and is provided on an upper end surface 10 in the thickness direction of the stator 2. A substantially semicircular rotor electrode 11 having a protruding step is provided on the lower surface of the rotor 3. A protrusion 12 having the same height as that of the rotor electrode 11 is also provided on the lower surface of the rotor 3, thus preventing the rotor 3 from tilting due to the presence of the rotor electrode 11. The rotor 3 is also provided with a driver recess 13 to permit the insertion of a tool, such as a screwdriver, for rotating the rotor 3.

The cover 4 is composed of a conductive metal, and is fixed to the stator 2 while accommodating the rotor 3. The rotor 3 is supported by the cover 4 to be rotatable relative to the stator 2.

An adjustment hole 14 to expose the driver recess 13 of the rotor 3 is provided in the cover 4. A spring-action portion 15, which is in contact with the rotor 3 and brings the rotor 3 into pressure contact with the stator 2, is provided at the periphery of the adjustment hole 14. The spring-action portion 15 extends downward toward the center at the periphery of the adjustment hole 14, and is provided with a plurality of protrusions 16.

Engaging sections 17 and 18 are provided on opposite sides of the cover 4 and extend downward. The engaging sections 17 and 18 are bent to be engaged with the lower surface of the stator 2. Thus, the cover 4 is fastened to the stator 2 via the engaging sections 17 and 18. The protruding section 9 provided on the lower surface of the stator 2 protrudes by substantially the same amount as that of the protrusions of the engaging sections 17 and 18, and thus the variable capacitor 1 is securely mounted on an appropriate wiring substrate (not shown in the drawing).

A rotor terminal 19 is also provided on the cover 4 and extends downward.

In the variable capacitor 1 having the structure described above, the rotor electrode 11 is opposed to the stator electrode 5 with a portion of the ceramic dielectric member defining the stator 2 therebetween, and thus capacitance is provided. The rotor 3 is rotated to change the effective overlapping area between the rotor electrode 11 and the stator electrode 5 to vary the capacitance. The adjusted capacitance is produced between the stator terminal 7, which is electrically connected to the stator electrode 5, and the rotor terminal 19 provided on the cover 4 which is in contact with the rotor 3 on which the rotor electrode 11 is provided.

In the variable capacitor 1, to increase the maximum capacitance and to obtain stable capacitance, the end surface 10 of the stator 2 is ground, and thus the thickness of the dielectric member between the end surface 10 and the stator electrodes 5 and 6 is decreased, and also a smoother surface is obtained on the end surface 10 in contact with the rotor electrode 11.

When the end surface 10 of the stator 2 is ground, to efficiently perform the grinding operation, a plurality of stators 2 are usually ground simultaneously.

FIGS. 5A and 5B show a conventional grinding method used for the grinding operation as described above. A workpiece 21 to be ground corresponds to the stator 2 and is schematically illustrated. ;The workpiece 21 shown in the drawing has a surface 22 to be ground on the lower surface in the thickness direction, and the surface 22 to be ground corresponds to the end surface 10. In the workpiece 21, an electrode 23 corresponding to the stator electrodes 5 and 6 extends parallel to the surface 22 to be ground. In the workpiece 21, a protruding section 24 corresponding to the protruding section 9 is also provided.

As shown in FIG. 5A, a holder 26 having a planar holding surface 25 is prepared and a plurality of workpieces 21 is prepared. The workpieces 21 have different thicknesses due to the fabricating method therefor.

Next, the workpieces 21 are held by the holder 26 with a surface 27 opposed to the surface 22 to be ground of each workpiece being in contact with the holding surface 25 of the holder 26. Additionally, although not shown in the drawing, to fix the individual workpieces 21 on the holding surface 25, for example, adhesion is provided.

The surfaces 22 of the workpieces 21 are ground by a grinder 28. In FIG. 5A, the position of the grinder 28 after grinding is performed is shown by the broken line. Consequently, the amount of grinding performed corresponding to the distance between the solid line, which shows the grinder 28 before grinding, and the broken line.

FIG. 5B shows the ground workpieces 21. As shown in the drawing, in the conventional grinding method, since the grinding operation is performed based on the opposite surfaces 27, the difference in the overall thicknesses of workpieces 21 leads to variations in the distances between the surfaces 22 to be ground and the electrodes 23 in the finished individual workpieces. Therefore, variations in capacitance occur in the variable capacitor 1.

To overcome the drawbacks described above, a grinding method as shown in FIGS. 6A to 6C has also been disclosed. In FIGS. 6A to 6C, the same reference numerals are used for the elements corresponding to the elements shown in FIGS. 5A and 5B, and the description thereof is omitted.

As shown in FIG. 6A, a first holder 30 having a planar holding surface 29, and a plurality of workpieces 21 are provided.

Next, the workpieces 21 are held by the first holder 30 with a surface 22 to be ground of each workpiece being in contact with the holding surface 29.

Next, opposite surfaces 27 of the workpieces 21 are subjected to primary grinding by a grinder 31 to the position indicated by the broken line in FIG. 6A while the workpieces 21 are held by the first holder 30.

FIG. 6B shows the workpieces 21 finished with the primary grinding. At this stage, the workpieces 21 are adjusted to have the same overall thickness.

Next, as shown in FIG. 6C, a second holder 33 having a planar holding surface 32 is provided.

The workpieces 21 are held by the second holder 33 with the opposite surface 27 of each workpiece 21 being in contact with the holding surface 32 of the second holder 33.

The surfaces 22 to be ground of the workpieces 21 held by the second holder 33 are subjected to secondary grinding by a grinder 34 to the position indicated by the broken line in FIG. 6C. Additionally, the grinder 34 and the grinder 31 may be the same.

In such a grinding method, in the primary grinding step, the opposite surfaces 27 are ground so that the workpieces 21 have the same overall thickness, and then the surfaces 22 to be ground are ground in the secondary grinding step. Therefore, in the workpieces 21 finished with the secondary grinding, variations in the distances between electrodes 23 and the ground surfaces 22 are reduced.

However, in the grinding method shown in FIGS. 6A to 6C, since the grinding operation must be performed in two steps, i.e., the primary grinding and the secondary grinding, the number of steps in the grinding operation is increased, resulting in a substantial increase in the cost of abrasive machining.

In abrasive machining, usually, unavoidable variations in machining occur, and since the grinding operation in which variations in machining are unavoidable is performed twice, the variations in machining are doubled, resulting in a substantial decrease in machining accuracy.

SUMMARY OF THE INVENTION

To overcome the above-described problems with the prior art, preferred embodiments of the present invention provide a grinding method in which the problems described above are eliminated. Further, preferred embodiments of the present invention provide an electronic component and a variable capacitor provided with an element ground by the novel grinding method.

A preferred embodiment of the present invention provides a grinding method, in which the grinding operation is performed on a plurality of workpieces having different thicknesses with an end surface in the thickness direction of each workpiece being a surface to be ground. The method includes the steps of holding the plurality of workpieces by a holder such that the surfaces to be ground of the individual workpieces are aligned in the same plane, and grinding the surfaces to be ground of the workpieces while the workpieces are held by the holder.

In another preferred embodiment of the present invention, a grinding method, in which the grinding operation is performed on a plurality of workpieces having different thicknesses with an end surface in the thickness direction of each workpiece being a surface to be ground, includes the steps of preparing an aligning member having a planar alignment surface, aligning the workpieces with the aligning member while the surfaces to be ground of the individual workpieces are in contact with the alignment surface of the aligning member, preparing a holder having a holding surface for holding the workpieces aligned by the aligning member on the side opposed to the surfaces to be ground, and a fixing agent to fix the individual workpieces on the holder, fixing the workpieces on the opposed side on the holding surface of the holder via the fixing agent, detaching the aligning member from the workpieces, and grinding the surfaces to be ground of the workpieces while the workpieces are fixed to the holder.

The fixing agent may be in a fixed form state or may be in an amorphous state depending on the conditions, and various types of fixing agent may be used.

For example, when the fixing agent is in a liquid state at room temperature and is solidified by cooling to a temperature which is lower than room temperature, the step for fixing the workpieces on the holder includes the step of interposing the fixing agent in a liquid state between the holder and the workpieces at a temperature equal to or higher than room temperature, and the step of cooling to solidify the fixing agent.

When the fixing agent is in a solid state at room temperature and is liquefied by heating to a temperature higher than room temperature, the step for fixing the workpieces on the holder includes the step of interposing the fixing agent in a liquid state between the holder and the workpieces while heating to a temperature higher than room temperature, and the step of decreasing the temperature to room temperature to solidify the fixing agent.

In the step of grinding the surfaces to be ground of the workpieces, the fixing agent for grinding may be cooled.

In the grinding method of preferred embodiments of the present invention, a fixing agent may be used to fix the workpieces on the aligning member. The fixing agent may be in a fixed form state or may be in an amorphous state depending on the conditions in a manner similar to the fixing agent used when grinding described above.

When the fixing agent for alignment is in a liquid state at room temperature and is solidified by cooling to a temperature which is lower than room temperature, the step of holding the workpieces by the aligning member includes the step of applying the fixing agent in a liquid state at a temperature equal to or higher than room temperature such that the fixing agent for alignment is brought into contact with the workpieces and the aligning member, and the step of cooling to solidify the fixing agent.

When the fixing agent for alignment is in a solid state at room temperature and is liquefied by heating to a temperature higher than room temperature, the step of holding the workpieces by the aligning member includes the step of applying the fixing agent in a liquid state while heating to a temperature higher than room temperature such that the fixing agent is brought into contact with the workpieces and the aligning member, and the step of decreasing the temperature to room temperature to solidify the fixing agent.

In the step of detaching the aligning member from the workpieces, the fixing agent is heated such that at least a portion thereof is transformed into a liquid state. Preferably, the fixing agent used for alignment is heated by heating the aligning member.

When the fixing agent is used for alignment, by selecting the appropriate combination of the fixing agent used when grinding and the fixing agent used for alignment while taking the characteristics of the fixing agents into consideration, it is possible to transfer the workpieces from the aligning member to the holder efficiently and smoothly, more specifically, the step of detaching the aligning member from the workpieces is carried out efficiently and smoothly. Examples of the preferable combination of the fixing agent used when grinding and the fixing agent used for alignment include the following.

Firstly, a fixing agent for grinding having a solidifying or liquefying temperature which is higher than that of the fixing agent for alignment may be used. Secondly, a fixing agent for grinding having different solubility in a predetermined solvent from that of the fixing agent for alignment may be used. Thirdly, a fixing agent for grinding having bonding force which is stronger than that of the fixing agent for alignment may be used.

Alternatively, without relying on the characteristics of the fixing agent for grinding and the fixing agent for alignment, the wettability at the holding surface of the holder may be set higher than the wettability at the alignment surface of the aligning member.

The grinding method of preferred embodiments of the present invention is advantageously applied to the grinding operation performed, for example, on the stator in the variable capacitor described above. That is, in the grinding method, the workpiece is a dielectric element provided with an electrode therein and the surface to be ground is an end surface of the dielectric element extending parallel to the electrode.

In another preferred embodiment of the present invention, an electronic component includes an element ground by the grinding method as described above.

In another preferred embodiment of the present invention, a variable capacitor includes a dielectric element ground by the grinding method as described above.

Other features, elements, characteristics and advantages of the present invention will become more apparent from the detailed description of preferred embodiments thereof with reference to the drawings.

DETAILED DESCRIPTION OF PREFERRED EMBODIMENTS

Figure 1A:
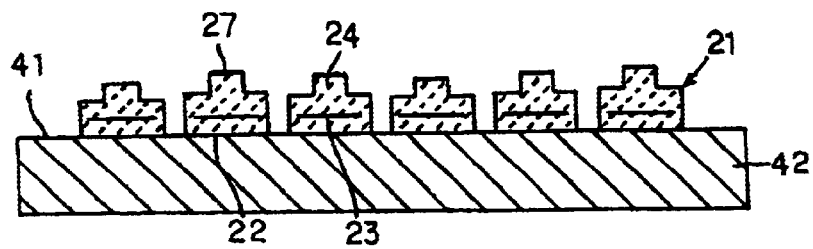
FIGS. 1A to 1E are sectional views which schematically show the steps of a grinding method according to a preferred embodiment of the present invention.

FIGS. 1A to 1E show the steps of a grinding method according to a preferred embodiment of the present invention. A workpiece 21, which is schematically shown in the drawings, corresponds to the stator 2 provided on the variable capacitor 1 shown in FIGS. 2 to 4, and with respect to the workpiece 21, the same reference numerals as those used in FIGS. 5A and 5B and FIGS. 6A to 6C are used for the corresponding portions.

First, as shown in FIG. 1A, a plate aligning member 42 having a planar alignment surface 41 is provided. A plurality of workpieces 21 are aligned with a surface 22 to be ground of each workpiece 21 being in contact with the alignment surface 41 of the aligning member 42.

Figure 1B:
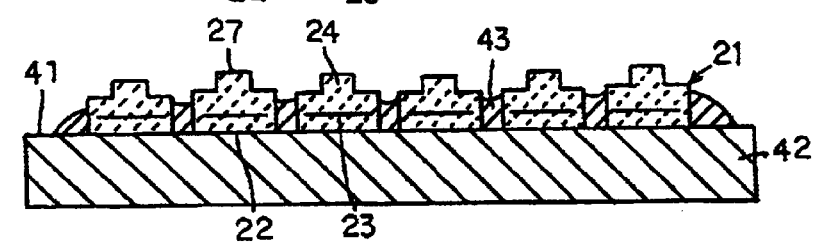

Next, as shown in FIG. 1B, the workpieces 21 are supported on the alignment member 42. More specifically, a fixing agent 43 for fixing the workpieces 21 on the aligning member 42 is provided, and using the fixing agent 43, the workpieces 21 are fixed on the aligning member 42.

Various types of fixing agent may be used for the fixing agent 43.

Firstly, a fixing agent 43 which is in a liquid state at room temperature and is solidified by cooling to a temperature lower than room temperature, such as water or a low-temperature coagulating agent, may be used. In such a case, the fixing agent 43 is applied in a liquid state and brought into contact with both the workpieces 21 and the aligning member 42 at a temperature equal to or higher than room temperature, and then the fixing agent 43 is solidified by cooling. Additionally, after the workpieces 21 are supported on the aligning member 42, until the next step is carried out, the aligning member 42 supporting the workpieces 21 is maintained in the cooled state.

Secondly, a fixing agent 43 which is in a solid state at room temperature and is liquefied by heating to a temperature higher than room temperature, such as a wax or a paraffin, may be used. In such a case, the fixing agent 43 is applied in a liquid state and brought into contact with both the workpieces 21 and the aligning member 42 while heating the fixing agent 43 to a temperature higher than room temperature, and then the fixing agent 43 for alignment is solidified by decreasing the temperature to room temperature. In such a case, the aligning member 42 supporting the workpieces 21 is maintained at room temperature.

Additionally, as described above, the workpieces 21 may be held by the aligning member 42 without using the fixing agent 43, and for example, the individual workpieces 2 may be supported by mechanical means.

Figure 1C:
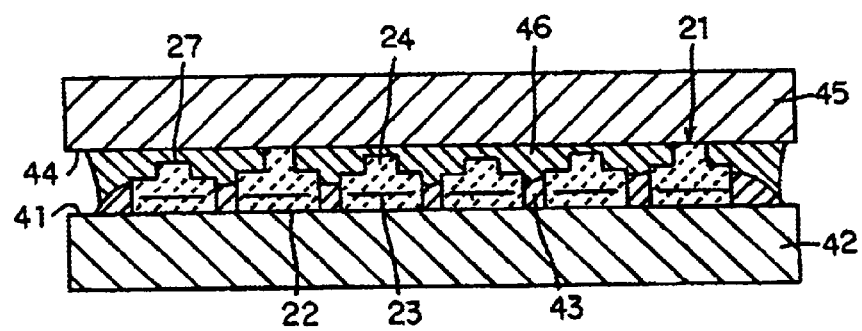

Next, as shown in FIG. 1C, a holder 45 having a holding surface 44 for holding the workpieces 21 held by the aligning member 42 on the surface 27 opposed to the surfaces 22 to be ground is provided, and a fixing agent 46 for fixing the workpieces 21 on the holder 45 is provided.

The workpieces 21 held by the aligning member 42 are fixed to the holding surface 44 of the holder 45 via the opposed surface 27 via the fixing agent 46. The fixing agent 46 is applied to fill the spaces between the workpieces 21 and the holding surface 44 while compensating for the dimensional difference in the spaces.

Various types of fixing agent may be used as the fixing agent 46 in a manner similar to the fixing agent 43 for alignment.

For example, a fixing agent 46 which is in a liquid state at room temperature and is solidified by cooling to a temperature lower than room temperature, such as water or a low-temperature coagulating agent, may be used. In such a case, to fix the workpieces 21 on the holder 45, the fixing agent 46 is applied in a liquid state between the holder 45 and the workpieces 21 at room temperature (or a temperature higher than room temperature), and then the fixing agent 46 is solidified by cooling.

Alternatively, a fixing agent 46 which is in a solid state at room temperature and is liquefied by heating to a temperature higher than room temperature, such as a wax or a paraffin, may be used. In such a case, to fix the workpieces 21 on the holder 45, the fixing agent 46 is applied in a liquid state between the holder 45 and the workpieces 21 while heating to a temperature higher than room temperature, and then the temperature is decreased to room temperature to solidify the fixing agent 46.

Figure 1D:
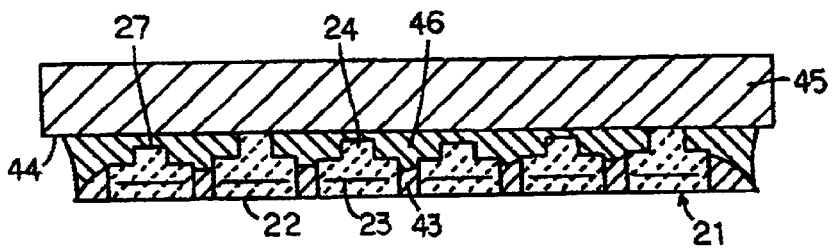

Next, as shown in FIG. 1D, the aligning member 42 is detached from the workpieces 21. At this stage, to efficiently detach the aligning member 42 from the workpieces 21, the fixing agent 43 is heated. Thus, at least a portion of the fixing agent 43 in contact with the alignment surface 41 is transformed into a liquid state.

When the fixing agent 43 is heated, although the entire element may be heated by an oven or other suitable heating device, preferably, the aligning member 42 is heated. By heating the aligning member 42, the fixing agent 43 for alignment is rapidly liquefied at the portion for detaching the aligning member 42 due to heat conduction, and even if the same fixing agent as the fixing agent 46 is used as the fixing agent 43, it is possible to liquefy only the fixing agent 43 and to maintain the fixing agent 46 in a not-yet liquefied state due to a difference in heat conduction, thus preventing the workpieces 21 from detaching from the holder 45.

Additionally, to more reliably prevent inadvertent liquefaction of the fixing agent 46, preferably, the solidifying or liquefying temperature of the fixing agent 46 is higher than the solidifying or liquefying temperature of the fixing agent 43.

Figure 1E:
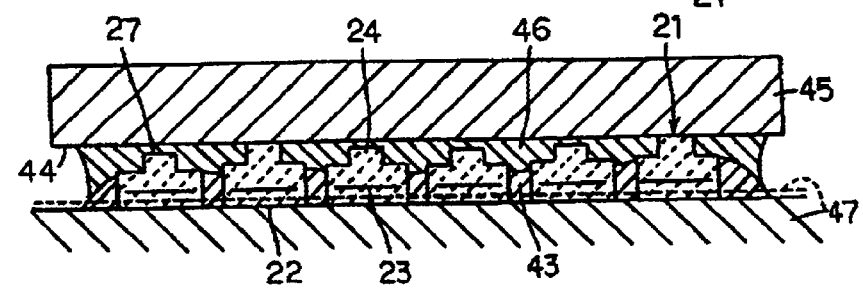

Next, as shown in FIG. 1E, the surfaces 22 of the workpieces 21 to be ground which are held by the holder 45 via the fixing agent 46 are ground by a grinder 47, for example, to the position indicated by the broken line.

As described above, since grinding is performed while the individual surfaces 22 to be ground are aligned in the same plane, a substantially uniform amount of grinding is performed on the plurality of workpieces 21 without being affected by the differences in the overall thickness of each workpiece 21. Thus, the variation in the distances between the surfaces 22 to be ground and the electrodes 23 after the grinding step is carried out is greatly reduced.

Additionally, although the overall thicknesses of the ground workpieces 21 may vary, such a variation does not substantially affect the characteristics of the variable capacitor 1.

In the step of grinding described above, grinding may be performed while cooling the fixing agent 46. In particular, if the fixing agent 46 for grinding is solidified by cooling to a temperature lower than room temperature, preferably, the grinding step is carried out while cooling.

After the grinding step is completed, the workpieces 21 are separated from the holder 45. At this stage, heating is performed at a temperature equal to or higher than the liquefying temperature of the fixing agent 46 to separate the workpieces 21 from the holder 45, and the fixing agent 46 and the fixing agent 43 adhering to the workpieces 21 are removed. To remove the fixing agent 46 and the fixing agent 43 adhered to the workpieces 21, in addition to heating, cleaning with a solvent or other suitable cleaning agent, or mechanical peeling may be employed.

In the step of detaching the aligning member 42 shown in FIG. 1D, to efficiently and smoothly perform the detachment, as described above, the fixing agent 43 is heated by heating the aligning member, or a fixing agent 43 having the solidifying or liquefying temperature lower than that of the fixing agent 46 may be used. Alternatively, the methods described below may be used.

Firstly, the fixing agent 43 and the fixing agent 46 having different solubility in a desired solvent may be used. For example, if a fixing agent which is soluble in water and insoluble in organic solvents is used as the fixing agent 43 and a fixing agent which is soluble in organic solvents and insoluble in water is used as the fixing agent 46, when the aligning member 42 is detached, the fixing agent 43 is dissolved in water. After grinding is performed, by dissolving the fixing agent 46 in organic solvents, the workpieces 21 is easily separated from the holder 45. Additionally, in such a case, more specifically, as the fixing agent 43, polyvinyl alcohol or other suitable agent which is soluble in water may be used, and as the fixing agent 46, a paraffin or other suitable agent which is soluble in ether may be used.

Secondly, a fixing agent 46 having a bonding strength greater than that of the fixing agent 43 may be used. Thereby, by simply pulling away the aligning member 42 from the holder 45, the aligning member 42 is separated from the workpieces 21 while the workpieces 21 remain adhered to the holder 45.

Thirdly, the wettability to a predetermined bonding agent at the holding surface 44 of the holder 45 may be set higher than the wettability at the alignment surface 41 of the aligning member 42. For example, the holder 45 is composed of a ceramic or other suitable material while the aligning member 42 is composed of a resin, such as polyethylene, polypropylene, or polyethylene terephthalate, surface treatment using a fluorine-containing resin is performed, or application of a releasing agent may be performed. In such a case, by simply pulling away the aligning member 42 from the holder 45, the aligning member 42 can also be separated from the workpieces 21 while maintaining adherence of the workpieces 21 to the holder 45.

Figure 2:
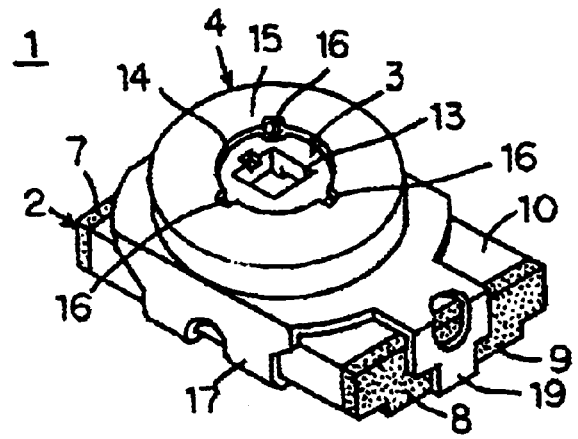
FIG. 2 is a perspective view showing an appearance of a variable capacitor 1 to which the present invention is directed.
Figure 3:
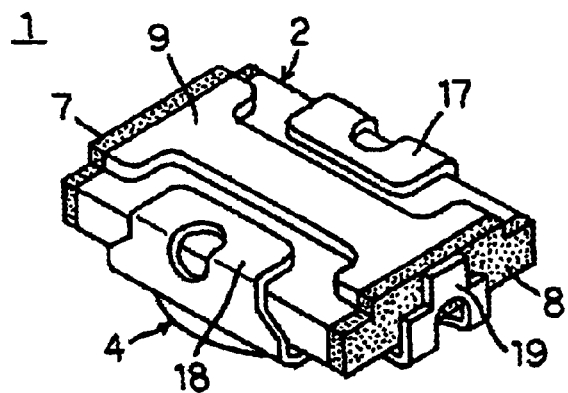
FIG. 3 is a perspective view of the variable capacitor 1 shown in FIG. 2.
Figure 4:
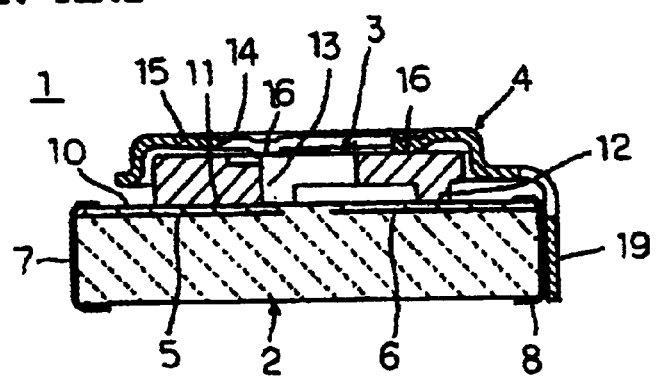
FIG. 4 is a sectional view of the variable capacitor 1 shown in FIG. 2.
Figure 5A:
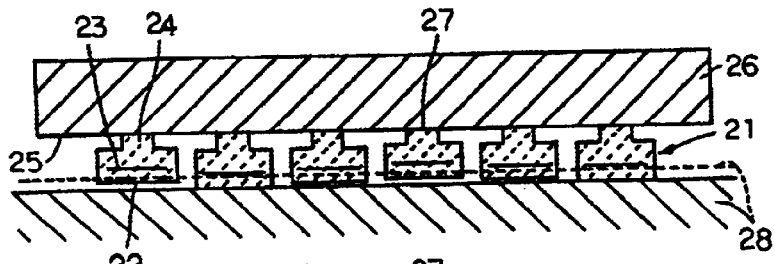
FIGS. 5A and 5B are sectional views showing a first conventional grinding method.
Figure 5B:
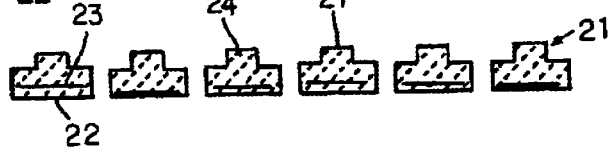
Figure 6A:
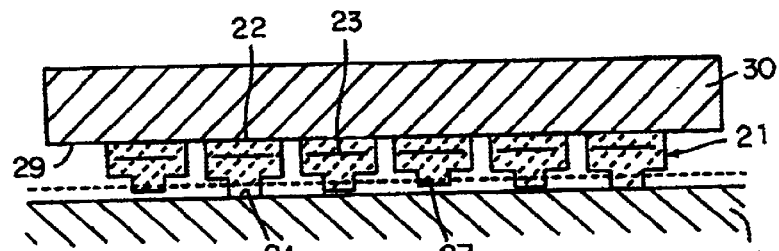
FIGS. 6A to 6C are sectional views showing a second conventional grinding method.
Figure 6B:
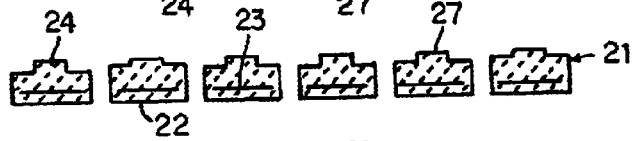
Figure 6C:
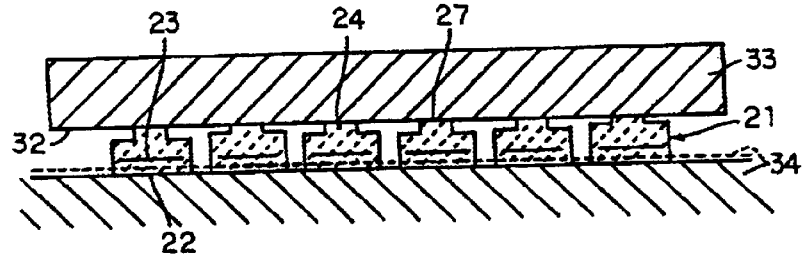

In the preferred embodiment described above, the workpiece 21 to which the grinding method of the present invention is applied is the stator 2 provided on the variable capacitor 1 shown in FIGS. 2 to 4. However, the present invention is not limited thereto. If a workpiece is a dielectric element provided with an electrode therein and a surface to be ground is an end surface of the dielectric element extending substantially parallel to the electrode, the grinding method of preferred embodiments of the present invention can be effectively used in a manner similar to that described above. In addition to such a dielectric element, with respect to an element which is to be ground provided on an electronic component, or an element which is used in the application other than for an electronic component, the grinding method of preferred embodiments of the present invention can be effectively used.

In the preferred embodiment described above, the workpieces 21 are adhered to the alignment surface 41 of the aligning member 42 by the fixing agent 43. However, the step of fixing the opposite surface 27 of workpieces 21 to the holding surface 44 of the holder 45 may be carried out without performing such a fixing step, by simply aligning the plurality of workpieces 21 with the aligning member 42.

Furthermore, to align the surfaces 22 to be ground of the workpieces 21 in the same plane, it is possible to use a method in which the aligning member 42 as described above is not used.

As described above, in accordance with the grinding method of preferred embodiments of the present invention, a plurality of workpieces are held by a holder such that the surfaces to be ground of the individual workpieces are aligned in the same plane, and the surfaces to be ground of the workpieces are ground while being held by the holder. Consequently, a uniform amount of grinding can be performed on the workpieces without being influenced by the variation in the overall thicknesses of the workpieces.

To obtain the uniform amount of grinding, since only one grinding step is carried out, the costs for abrasive machining is greatly reduced, and machining accuracy greatly improved.

In preferred embodiments of the present invention, to align the surfaces to be ground of the individual workpieces in the same plane, the aligning member having a planar alignment surface is provided and the workpieces are aligned by the aligning member while the surfaces to be ground are in contact with the alignment surface. Thus, the surfaces to be ground of the individual workpieces are aligned in the same plane.

To hold the workpieces with the holder, the fixing agent for fixing the workpieces to the holder is provided, and the workpieces, which are aligned by the aligning member, on the surfaces opposed to the surfaces to be ground are fixed on the holding surface of the holder via the fixing agent. Thus, regardless of the variation in the overall thicknesses of the workpieces, the workpieces are easily affixed to the holder. Consequently, by detaching the aligning member from the workpieces after the workpieces are fixed on the holding surface of the holder, the surfaces to be ground of the workpieces are exposed, and grinding of the surfaces to be ground of the workpieces while the workpieces are fixed to the holder is performed.

If the fixing agent for affixing the workpieces to the holder which is in a liquid state at room temperature and is solidified by cooling to a temperature which is lower than room temperature is used, or if the fixing agent which is in a solid state at room temperature and is liquefied by heating to a temperature higher than room temperature is used, by controlling the temperature conditions over the fixing agent, the workpieces are easily affixed to and separated from the holder.

When the fixing agent is used, in the step of grinding the surface to be ground of the workpieces, by cooling the fixing agent for grinding, the workpieces are more securely affixed by the fixing agent to the holder.

As described above, when the aligning member is used to hold the workpieces by the aligning member, if the fixing agent is used for fixing the workpieces on the aligning member, the workpieces are effectively held by the aligning member, and the subsequent steps are carried out without unwanted misalignment of the workpieces.

By using the fixing agent which is in a liquid state at room temperature and is solidified by cooling to a temperature which is lower than room temperature, or by using the fixing agent for alignment which is in a solid state at room temperature and is liquefied by heating to a temperature higher than room temperature, in a manner similar to that of the fixing agent, it is possible to easily affix the workpieces to the aligning member and to easily detach the aligning member from the workpieces by controlling the temperature conditions over the fixing agent for alignment.

When the aligning member is detached from the workpieces, by heating the fixing agent such that at least a portion thereof is transformed into a liquid state, detachment is easily and effectively performed.

To heat the fixing agent, if the aligning member is heated, the fixing agent is rapidly liquefied at the portion required to detach the aligning member due to heat conduction, and also even if the same fixing agent for the fixing agent for grinding is used as the fixing agent for alignment, it is possible to liquefy only the fixing agent for alignment and to maintain the fixing agent for grinding in a not-yet liquefied state due to a difference in heat conduction, thus preventing the workpieces from inadvertently detaching from the holder.

In preferred embodiments of the present invention, when both of the fixing agents are used, by setting the solidifying or liquefying temperature of the fixing agent for grinding higher than that of the fixing agent for alignment, by using the fixing agent for grinding and the fixing agent for alignment having different solubility in a predetermined solvent, by using the fixing agent for grinding having bonding force which is stronger than that of the fixing agent for alignment, or by setting the wettability to a predetermined bonding agent at the holding surface of the holder is set higher than the wettability at the alignment surface of the aligning member, it is possible to efficiently and smoothly detach the aligning member from the workpieces, and consequently, it is possible to easily transfer the workpieces from the aligning member to the holder.

By applying the grinding method of preferred embodiments of the present invention to a dielectric element provided with an electrode therein in a variable capacitor, more specifically, a stator provided with a stator electrode, the variations in capacitance produced by the variable capacitor are greatly decreased, and consequently, a highly precise variable capacitor in which the allowable range of capacitance must be narrow is produced. Since the variation in the amount of grinding is greatly decreased, the distance between the electrode and the surface to be ground can be substantially decreased, and therefore the maximum capacitance can be greatly increased, resulting in a substantial increase in the adjustment range of capacitance.

While the invention has been particularly shown and described with reference to preferred embodiments thereof, it will be understood by those skilled in the art that the foregoing and other changes in form and details can be made without departing from the spirit and scope of the invention.

What is claimed is:

1. A grinding method, in which a grinding operation is performed on a plurality of workpieces having different thicknesses with an end surface in the thickness direction of each workpiece being a surface to be ground, comprising the steps of:
   holding the plurality of workpieces with a holder such that the surfaces to be ground of the individual workpieces are aligned in the same plane; and
   grinding the surfaces to be ground of the workpieces while the workpieces are held by the holder.

2. A grinding method according to claim 1, wherein the workpieces are dielectric elements provided with an electrode therein and the surface to be ground is an end surface of the dielectric element extending substantially parallel to the electrode.

3. An electronic component comprising an element ground by a grinding method in which a grinding operation is performed on a plurality of workpieces having different thicknesses with an end surface in the thickness direction of each workpiece being a surface to be ground, comprising the steps of:

holding the plurality of workpieces with a holder such that the surfaces to be ground of the individual workpieces are aligned in the same plane; and grinding the surfaces to be ground of the workpieces while the workpieces are held by the holder.

4. A variable capacitor comprising an element around by a grinding method in which a grinding operation is performed on a plurality of workpieces having different thicknesses with an end surface in the thickness direction of each workpiece being a surface to be ground, comprising the steps of:

holding the plurality of workpieces with a holder such that the surfaces to be ground of the individual workpieces are aligned in the same plane; and grinding the surfaces to be around of the workpieces while the workpieces are held by the holder.

5. A grinding method, in which the grinding operation is performed on a plurality of workpieces having different thicknesses with an end surface in the thickness direction of each workpiece being a surface to be ground, comprising the steps of:

providing an aligning member having a planar alignment surface;

aligning the workpieces with the aligning member while the surfaces to be ground of the individual workpieces are in contact with the alignment surface of the aligning member;

providing a holder having a holding surface to hold the workpieces aligned by the aligning member on the surfaces opposed to the surfaces to be ground, and a first fixing agent to affix the individual workpieces to the holder;

fixing the opposed surfaces of the workpieces to the holding surface of the holder via the first fixing agent;

detaching the aligning member from the workpieces; and grinding the surfaces to be ground of the workpieces while the workpieces are fixed to the holder.

6. A grinding method according to claim 5, wherein the first fixing agent is in a liquid state at room temperature and is solidified by cooling to a temperature which is lower than room temperature, and the step of fixing the workpieces to the holder includes the step of interposing the first fixing agent in a liquid state between the holder and the workpieces at a temperature substantially equal to or higher than room temperature, and the step of cooling to solidify the first fixing agent.

7. A grinding method according to claim 5, wherein the first fixing agent is in a solid state at room temperature and is liquefied by heating to a temperature higher than room temperature, and the step of fixing the workpieces to the holder includes the step of interposing the first fixing agent in a liquid state between the holder and the workpieces while heating to a temperature higher than room temperature, and the step of decreasing the temperature to room temperature to solidify the first fixing agent.

8. A grinding method according to claim 5, wherein the step of grinding the surfaces to be ground of the workpieces is carried out while cooling the first fixing agent.

9. A grinding method according to claim 5, further comprising the step of preparing a second fixing agent to fix the workpieces on the aligning member, wherein the step of aligning the workpieces with the aligning member includes the step of fixing the workpieces to the alignment member with the second fixing agent.

10. A grinding method according to claim 9, wherein the second fixing agent is in a liquid state at room temperature and is solidified by cooling to a temperature which is lower than room temperature, and the step of fixing the workpieces to the aligning member includes the step of applying the second fixing agent in a liquid state at a temperature that is substantially equal to or higher than room temperature so that the fixing agent for alignment is brought into contact with the workpieces and the aligning member, and the step of cooling to solidify the second fixing agent.

11. A grinding method according to claim 9, wherein the second fixing agent is in a solid state at room temperature and is liquefied by heating to a temperature higher than room temperature, and the step of fixing the workpieces to the aligning member includes the step of applying the second fixing agent in a liquid state while heating to a temperature higher than room temperature so that the second fixing agent is brought into contact with the workpieces and the aligning member, and the step of decreasing the temperature to room temperature to solidify the second fixing agent.

12. A grinding method according claim 10, wherein the step of detaching the aligning member from the workpieces is carried out by heating the second fixing agent such that at least a portion of the second fixing agent is transformed into a liquid state.

13. A grinding method according to claim 12, wherein in the step of detaching the aligning member from the workpieces, the second fixing agent is heated by heating the aligning member.

14. A grinding method according to claim 10, wherein the solidifying or liquefying temperature of the first fixing agent is higher than the solidifying or liquefying temperature of the second fixing agent.

15. A grinding method according to claim 9, wherein the first fixing agent and the second fixing agent have different solubility.

16. A grinding method according to claim 9, wherein the first fixing agent has a bonding strength which is greater than that of the second fixing agent.

17. A grinding method according to claim 9, wherein the wettability to a bonding agent at the holding surface of the holder is greater than the wettability at the alignment surface of the aligning member.

18. A grinding method according to claim 5, wherein the workpiece is a dielectric element provided with an electrode therein and the surface to be ground is an end surface of the dielectric element extending substantially parallel to the electrode.

19. An electronic component according to claim 3, wherein the workpiece is a dielectric element provided with an electrode therein and the surface to be around is an end surface of the dielectric element extending substantially parallel to the electrode.

20. A variable capacitor according to claim 4, wherein the workpiece is a dielectric element provided with an electrode therein and the surface to be ground is an end surface of the dielectric element extending substantially parallel to the electrode.

* * * * *